UNITED STATES PATENT OFFICE 2,666,015

BIOCHEMICAL PROCESSES FOR THE 11-HYDROXYLATION OF STEROIDS

Gregory Pincus and Oscar Hechter, Worcester, Mass., assignors to G. D. Searle & Co., Chicago, Ill., a corporation of Illinois No Drawing. Application August 13, 1949, Serial No. 110,225

3 Claims. (Cl. 195—51)

This invention relates to processes for introducing oxygen functions into steroids at the 11-position. More particularly this invention relates to methods of introducing 11-hydroxyl groups into steroidal hormones by perfusing dilute solutions of steroidal hormones through excised adrenal glands under such conditions that the glands are maintained in a living secreting state, whereby hydroxy radicals are formed by biochemical processes in the 11-positions of said hormones.

By our processes it is possible to convert 11-desoxycorticosterone, which has the formula

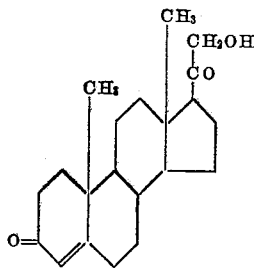

into corticosterone, which has the formula

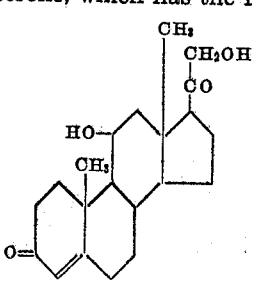

It is likewise possible by our methods to introduce an oxygen function into the 11-position of 11-desoxy-17-hydroxycorticosterone, which has the formula

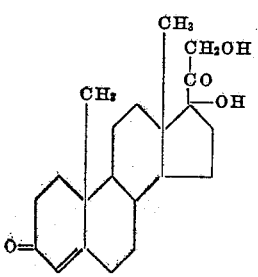

Other steroids which can similarly be oxygenated in the 11-position include the following:

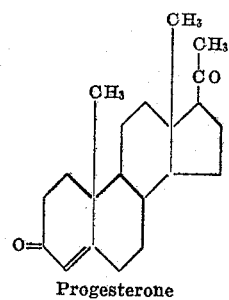

Progesterone

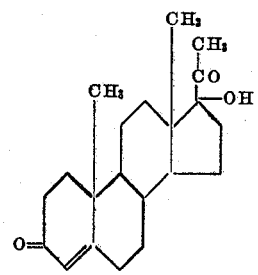

17-Hydroxyprogesterone

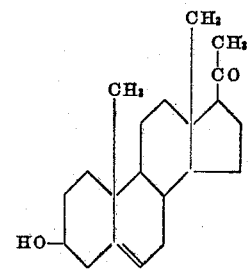

Steroids containing oxygen functions in the 11-position are extremely difficult to synthesize and to date no feasible method has been perfected for their manufacture. Such compounds are of great value as intermediates in the production of adrenal cortex hormones. The best-known of such hormones is cortisone (also called Compound E) which is 17-hydroxy-11-dehydrocorticosterone and has the formula

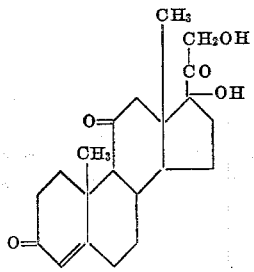

The production of cortisone has been achieved by an extraordinarily complex series of thirty-three steps from desoxycholic acid (Journal of Biological Chemistry, vol. 162, pages 601 to 631, 1946). This method has produced sufficient of the harmone to demonstrate its remarkable therapeutic properties, but the procedure is so tortuous that supplies of cortisone for clinical studies are seriously limited (Proceedings of the Staff Meetings of the Mayo Clinic, vol. 24, pages 181 et sub., 1949). 17 - hydroxy - 11 - dehydrocorticosterone and related steroidal hormones such as corticosterone, affect the carbohydrate and protein metabolism by increasing conversion of protein to carbohydrate by the liver and by increasing the liver's store of glycogen. These hormones also increase the working capacity of isolated muscle. A most important use for 17-hydroxy-11-dehydrocorticosterone has been in the treatment of rheumatoid arthritis. The use of this substance in rheumatoid arthritis has resulted in improvement within a few days. Pain, stiffness and limitation of movement were reduced, and tenderness and muscular pain relieved. Appetite and weight improved and "toxicity" was replaced by a sense of well-being. The role of the harmone in other conditions such as myasthenia gravis and rheumatic fever is being studied.

It is the object of this invention to provide simple and relatively inexpensive methods for obtaining 11-hydroxy steroids from accessible starting materials. It is further an object to provide methods for producing 17-hydroxycorticosterone and other related 11-hydroxy compounds in a state of purity by simple and efficient biochemical methods. Other objects will be apparent to those skilled in the art.

According to our invention, excised mammalian adrenal glands are maintained in a living, functioning state by perfusion with an appropriate medium, natural or synthetic, at temperatures in the range of 35–40° C. and preferably at 36–37.5° C., and to the perfusion medium is added a quantity of steroid to be oxygenated in the 11-position. After the medium has circulated through the gland at least once, the perfusate is removed and the hormones separated by known procedures. The perfusion medium can comprise blood, blood plasma, or blood serum. For most successful operation, plasma or whole blood constitute the most desirable perfusion media. Whole blood is further preferably defibrinated by being passed through a heart-lung or liver preparation before use as a perfusion medium, though for short periods of perfusion this may not be necessary. This is desirable both in order to avoid formation of clots, and to remove possible vasoconstrictor substances which might interfere with the free flow of the perfusate through the organ. Other media, such as blood serum or artificial media, may be used for short periods, but in general they are not as satisfactory as plasma or whole blood. The medium, if other than blood, must be isotonic and have the same colloid osmotic pressure as blood. It is often desirable to add a small amount of ascorbic acid to the medium, preferably in the range of about 2 mg. per 100 cubic centimeters. Increased amounts of ascorbic acid may be used with less frequent renewal. For instance, when 40 mg. per 100 cc. are added initially, renewal should not be necessary for approximately 20 hours of perfusion. The ascorbic acid is generally advantageous in perfusions which are carried out over periods of many hours. In short perfusions it is unnecessary. The perfusion medium must be supplied under continuous but pulsating pressures to insure adequate operation. The pressure should not be below 40 mm. of mercury nor exceed 200 mm., although it is unnecessary that the pulsations reach either of these extremes at any time. Generally pressures in the range of 90–130 mm. are preferred. These pulsations should be at a rate of not less than 24 and not more than 180 per minute. The length of the period of perfusion may vary from several minutes to a few hours. The time of perfusion is not an important factor. It is only necessary that the fluid containing the steroid pass through the functioning gland at least once. Additional passes may give more of the oxygenated steroids, but also appear to give further degradation products which in some instances complicate the isolation procedure. In practice we have found that the more rapid perfusions (5 to 35 cc. per minute) give the best yields of purest materials.

Among the steroids which can be used in our invention are progesterone, 17-hydroxyprogesterone, 11-desoxy corticosterone, 11-desoxycorticosterone acetate and succinate, 11-desoxy-17-hydroxycorticosterone, the pregnanediols and pregnanolones, $\Delta^4$-androstenedione, isoandrosterone, dehydroisoandrosterone, $\Delta^5$-pregnenolone, and related steroids. The concentration of these steroids in the perfusion medium may vary from 1 to 200 mg. per 100 ml. of perfusion medium. The preferred concentration is about 50–100 mg. per liter.

The adrenal glands which are used in our processes may be obtained from any of the common animals including the horse, sheep, pig, cattle, dog, rabbit, cat, and monkey. The following illustrates a method of preparing a mammalian adrenal gland for use in our procedure:

A laparotomy is performed on an anesthetized or freshly killed animal and the kidney region exposed. The entire region of the paired adrenal glands is dissected and all the arteries except the one to be cannulated are tied off. A cannula is inserted into the aorta just below the renal arterial branch supplying the adrenals or into any direct aortic branch to the adrenal region. A buffered balanced salt solution may be washed through the cannulated preparation to remove all blood remaining in the vessels of the preparation but this is not absolutely necessary. The cannula is then affixed to the arterial entry of a perfusion pump designed to circulate the perfusion medium continually under pulsating pressure as specified above, and circulation of this medium is promptly started. It is essential that transfer of the cannulated preparation to the perfusion apparatus be rapid and that prompt perfusion be started with the medium at a pressure sufficient to insure active circulation through the glandular tissue. The above operations and perfusion are best conducted under completely sterile conditions in order to insure maximal survival of the glands, though for shorter periods of perfusion absolute sterility is not required. Sterility can be maintained by the addition to the medium of suitable concentrations of antibiotics such as penicillin and streptomycin.

The steroid hormones which are produced by our processes can be isolated from the perfusion medium by a variety of methods. The simplest is by direct extraction of the medium with a halogenated solvent such as chloroform, carbon tetrachloride, methylene chloride, ethylene chloride and the like. Upon removal of the solvent, preferably by evaporation under vacuum at low temperature in an inert atmosphere, there is obtained a residue of the stearoids. This residue contains relatively large quantities of fats and other lipids when the medium is whole blood. Alternatively the perfusion medium may be dialyzed against saline solution and the latter extracted as above. The steroids which are in solution in the perfusate pass through the membrane and are about equally distributed between the medium and the saline solution. This method has the advantage of avoiding contamination with large amounts of fats, but does not give as high yields of steroids since some of the latter are left in the perfusate. The most convenient isolation procedure is that whereby the steroids are absorbed directly from the perfusion medium on activated charcoal, the latter is washed with water or saline solution and then extracted with a suitable solvent such as methylene chloride, ethylene chloride, chloroform, acetone, ethyl acetate and the like. In eluting the steroids from the charcoal it has been found advantageous first to extract the charcoal with acetone for a short period in order to remove undesired material. The charcoal is then extracted with warm methylene or ethylene chloride and the desired 11-oxygenated steroids are isolated in a relatively pure form. Further extraction with warm benzene removes other steroids, some of which are crystalline.

As used herein, the term "oxygen function" means a hydroxyl (oxy) group. The term "oxygenation" refers to the introduction of an oxygen function into an organic compound. A formaldehydogenic steroid is one which contains the α-ketol or α-glycol configurations at the 20- 21- positions and which on periodic acid oxidation gives rise to formaldehyde.

Our invention is disclosed in detail by means of the following examples but is not to be construed as limited thereto.

*Example 1*

100 mg. of 11-desoxycorticosterone were added to 400 cc. of citrated beef blood and perfused through a beef adrenal gland for 3.5 hours at a mean pressure of 100 mm. of mercury. The average blood flow was about 9 cc. per minute. 200 cc. of this perfusate was dialyzed against 2 liters of saline solution (0.85% sodium chloride solution) for 3 days at 2° C. The saline solution was extracted with chloroform and the chloroform extract was washed with dilute acid, dilute alkali and water. Evaporation of the chloroform gave a residue of neutral material. A sample of this residue was analyzed for formaldehydogenic steroids by the periodic acid method ("The Hormones," by Pincus and Thimann, vol. 1, 1948, p. 613). From the 100 mg. of steroid used, 21 mg. of formaldehydogenic steroids were obtained. The neutral residue was assayed by the glycogen deposition test (Pabst et al., Endocrinology, vol. 41, pp. 55–65, July 1947) and was found active at the 500 microgram dosage level. This material was therefore approximately equivalent to 10 mg. of corticosterone.

*Example 2*

1500 cc. of plasma containing in solution 150 mg. of 11-desoxycorticosterone was perfused through a beef adrenal gland for about 3 hours, according to the method of Example 1. The perfusate was then placed in viscose tubing and allowed to stand, with occasional gentle rocking, for about 2.5 days with 500 cc. of citrated isotonic saline solution containing 1.5 g. of activated charcoal. The charcoal was collected, washed with water, and stirred with four 50-cc. portions of acetone. The acetone solutions were combined and evaporated under reduced pressure in a nitrogen atmosphere. The residue was extracted with chloroform. The chloroform solution was dried with anhydrous sodium sulfate and evaporated under vacuum. The residue of 83 mg. of semi-crystalline material contained 61 mg. of formaldehydogenic steroids.

The semi-crystalline residue was dissolved in benzene and passed through a column (0.8 x 18 cm.) containing T-200 silica gel. The gel was eluted with benzene-ethyl acetate mixtures and about 25 mg. of nearly pure corticosterone (M. P. 170–176° C.) and about 25 mg. of nearly pure 11-desoxycorticosterone (M. P. 138.5–140.5° C.) were obtained. The melting point of a mixture of the foregoing corticosterone with an authentic sample (M. P. 178–182° C.) was 171–179° C. The melting point of the foregoing 11-desoxycorticosterone mixed with an authentic sample was 138–140° C.

*Example 3*

One liter of whole blood containing 100 mg. of dissolved desoxycorticosterone was perfused through a beef adrenal gland as in Example 1. The perfusate was then stirred for 30 minutes with 5 g. of activated charcoal at about 23° C. and allowed to stand over night at about 5° C. The blood was decanted and stirred as above with a second 5-g. portion of activated charcoal at about 15° C. The combined charcoal was collected, washed with saline solution and dried under nitrogen at 45° C. and 23 mm. pressure. The charcoal was continuously extracted with methylene chloride. The extract was evaporated under reduced pressure and a residue of 99 mg. of oily material containing 29 mg. of formaldehydogenic steroids was obtained. The residue was seeded with corticosterone and soon set to a crystalline means. This was moistened with ether and collected on a filter, affording 13 mg. of crystalline corticosterone of M. P. 150–160° C.

*Example 4*

200 cc. of plasma containing 25 mg. of 11-desoxy - 17 - hydroxycorticosterone was perfused through a beef adrenal gland for about 2 hours according to Example 1. The perfusate was stirred for 30 minutes with 1 g. of activated charcoal at about 20° C. and the charcoal separated. The charcoal treatment was repeated and the two batches of charcoal were combined, washed with saline solution and dried under nitrogen at 40° C. and 10 mm. pressure. The dried charcoal was extracted in a Soxhlet extractor with ethylene chloride. The extract was evaporated under vacuum and a residue of 22 mg. of oily material containing 8 mg. of formaldehydogenic steroids was obtained. This residue was assayed by the glycogen deposition test and was found to be equivalent to approximately 6 mg. of 17-hydroxy-11-dehydrocorticosterone.

Example 5

100 cc. of plasma containing in solution about 10 mg. of 11-desoxycorticosterone was perfused as in Example 1. The perfusate was shaken for a few minutes with 1 g. of activated charcoal and then left over night at about 5° C. The charcoal was collected, washed with water and then stirred for a few minutes with acetone. The charcoal was removed and extracted in a Soxhlet extractor with methylene chloride. The methylene chloride extract was evaporated under nitrogen at reduced pressure and afforded a semi-crystalline residue weighing 14 mg. and containing about 7 mg. of formaldehydogenic steroids. The latter consisted mainly of corticosterone. The charcoal was further extracted in the Soxhlet apparatus with benzene. After removal of the solvent under vacuum in an inert atmosphere a partially crystalline residue of steroid material was obtained.

Example 6

100 cc. of plasma containing in solution about 10 mg. of 11-desoxy-17-hydroxycorticosterone was perfused through a horse adrenal gland for about 20 minutes at a mean pressure of about 120 mm. of mercury and an average flow of about 5 cc. per minute. The perfusate was stirred for 5 minutes with 1.5 g. of activated charcoal at about 20° C. and then left for 15 hours at 5° C. The charcoal was separated, washed with cold water and then with cold acetone. It was then extracted continuously with warm methylene chloride. The resulting extract was evaporated under nitrogen and reduced pressure at room temperature. The partially crystalline residue contained about 8 mg. of formaldehydogenic steroids. By the glycoglu deposition test it was active at a dosage level of about 100 micrograms.

We claim:

1. The method of hydroxylating 11-desoxycorticosterone in the 11-position which comprises perfusing an isolated functioning mammalian adrenal gland with blood plasma containing said steroid, and subsequently isolating the 11-hydroxy steroids from the perfusion fluid.

2. The method of hydroxylating 11-desoxy-17-hydroxycorticosterone in the 11-position which comprises perfusing an isolated functioning mammalian adrenal gland with blood plasma containing said steroid, and subsequently isolating the 11-hydroxy steroids from the perfusion fluid.

3. The method of introducing a hydroxyl radical into the 11-position of a steroid selected from the group consisting of 11-desoxycorticosterone and 11-desoxy-17-hydroxycorticosterone which comprises dissolving said steroid in a fluid selected from blood, blood plasma and blood esrum; passing the solution so obtained through a functioning, excised, mammalian adrenal gland; and subsequently isolating the 11-hydroxyl steroids thus produced.

GREGORY PINCUS.
OSCAR HECHTER.

References Cited in the file of this patent

UNITED STATES PATENTS

| Number | Name | Date |
| --- | --- | --- |
| 1,515,976 | Stern | Nov. 18, 1924 |
| 2,166,877 | Reichstein | July 18, 1939 |

OTHER REFERENCES

Vogt in J. Physiol., vol. 102 (1943), pages 341–356.

Pincus, "The Hormones," vol. I, 1948, pages 551, 557 and 622.